United States Patent
Mandelcorn et al.

(10) Patent No.: US 6,845,551 B2
(45) Date of Patent: Jan. 25, 2005

(54) METHOD OF MAKING A POWER ELECTRONICS CAPACITOR

(75) Inventors: Lyon Mandelcorn, Pittsburgh, PA (US); John Bowers, Cooperstown, NY (US); Eugene R. Danielson, Canton, MI (US); Stephen R. Gurkovich, Eldersburg, MD (US); Kenneth C. Radford, Gambrills, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 49 days.

(21) Appl. No.: 10/459,165

(22) Filed: Jun. 12, 2003

(65) Prior Publication Data

US 2004/0250393 A1 Dec. 16, 2004

(51) Int. Cl.[7] ................................................. H01G 7/00
(52) U.S. Cl. ........................ 29/25.42; 29/592.1; 29/831; 29/832; 29/842; 29/846; 361/301.4; 361/308.1; 361/313; 361/763; 361/764; 75/414; 257/306; 257/310; 257/528; 257/532; 427/79; 427/80
(58) Field of Search ............................. 29/25.42, 592.1, 29/831, 832, 842, 846; 75/414; 257/306, 310, 528, 532; 361/301.4, 308.1, 311–313, 761–764; 427/79, 80

(56) References Cited

U.S. PATENT DOCUMENTS 4,097,911 A * 6/1978 Dorrian ...................... 361/305
4,223,369 A * 9/1980 Burn ........................ 361/321.4
4,342,143 A * 8/1982 Jennings ..................... 29/25.42
4,701,827 A * 10/1987 Fujikawa et al. ........... 361/309

FOREIGN PATENT DOCUMENTS

JP          09232087 A  *  9/1997  ........... H05B/41/00

OTHER PUBLICATIONS

"Practical next generation solution for stand–alone and embedded DRAM capacitor"; Jong–Ho Lee; Jung–Hyoung Lee; Yun–Seo Kim; Hyung–Seok Jung; Nae–In Lee; Ho–Kyu Kang; Kwang–Pyuk Suh; Digest of Technical Papers. Symposium on 6/11–13 200 pp. 114–115.*

* cited by examiner

Primary Examiner—A. Dexter Tugbang
Assistant Examiner—Paul D Kim
(74) Attorney, Agent, or Firm—David L. Kuhn; Luis Miguel Acosta

(57) ABSTRACT

There is disclosed herein a high voltage and high temperature power electronics capacitor which comprises one or more insulator layers of mica paper, and one or more metal conductor layers, all dispersed in a pressurized environment of a nonreactive and high voltage strength gas maintained at near ambient to about 405.2 kPa of pressure. The insulator and conductor layers are isolated and separated from one another by the alternating placement of conductor layers between said insulator layers. These capacitors are readily packaged for commercial use in containers or housings of almost any geometric form and any material of construction. Moreover, low inductance ceramic bushings can be employed on these containers for establishing external electrical contacts. These capacitors can be economically manufactured and used in large commercial volumes with currently available materials and production methods.

13 Claims, 3 Drawing Sheets

METHOD OF MAKING A POWER ELECTRONICS CAPACITOR

The invention described herein may be made, used, and licensed by, or for, the United States Government for governmental purposes without paying us any royalty.

BACKGROUND AND SUMMARY

The present invention relates to capacitors in general, and more especially to a high temperature and high voltage power electronics capacitor comprising metal conductors, solid insulators/separators, and a non-reacting gas as an impregnant/dielectric. The resulting capacitor has exceptional electrical properties attributable to its unique dielectric/insulator system or package of reconstituted mica papers and non-reacting gases. The electronic circuits of today provide a variety of functions, including power factor correction, high voltage spike suppression, AC filtration, and prime sources of steady DC voltage or high power pulses.

The components and design of a capacitor are essential to its ultimate application. In simple form, a capacitor comprises at least two terminals that couple two metal conductors, which are separated and/or isolated by a dielectric component. The arrangement and the electrical properties of this dielectric will expeditiously impact the voltage rating and charge storage capability of the final capacitor. Therefore, any dielectric must have low electrical conductivity, and will usually be in the form of any combination of solids, liquids, or gases. Combinations of solid/liquid or solid/gas are typically preferred for higher voltages. Because our modern electrical and electronic systems command low-loss capacitors with higher performance prowess in terms of capacitance, operating temperatures, and energy or power densities, a suitable power electronics capacitor for these systems often employs a solid, polymeric dielectric material.

Presently, a variety of complex electronic systems are used in a host of governmental and industrial applications that could significantly benefit from the development of new elements and components, such as capacitors, which have been designed and dedicated for service in high temperature and/or harsh environments. Typical applications include, but are not limited to, the fields of space-based communications, aerospace operations, defense systems, and the exploitation of natural resources. Therein, capacitors normally require applied operating voltages of more than 1–3 $kV_{DC}$, and if such capacitors were available, they would operate at temperatures in excess of 300° C., inclusive.

Current system designs either specify component isolation from these environments and potential heat sources, or they mandate the provision of cooling devices and moderating systems that will ameliorate these exposures. However, these latter designs often employ coolants, pumps, reservoirs, fittings, cabling, and/or connectors which evolve even greater volumes, higher weights, larger payload reductions, and significant costs. The resultant electronic systems often fail to reach their complete potentials due to either inadequate performance or very low efficiencies. Moreover, these systems experience larger maintenance requirements, more frequent outages, and higher costs than would be expected if a more comprehensive approach were initially taken.

In the art, Custom Electronics, Incorporated, of Oneonta, N.Y., USA, provides a commercially available power electronics capacitor with a maximum operating temperature of about 260° C. That device has operating voltage stress of about 25 volts per micrometer of thickness for its solid dielectric material ($V_{DC}/\mu m$), a dielectric constant ($\epsilon$) near 5, and an energy density of around 0.014 $J/cm^3$. While that capacitor uses a silicone-impregnated, reconstituted mica paper dielectric, it is not deployable under the circumstances which are contemplated by the instant invention because the impregnant used therein is thermally degraded at temperatures approaching 260° C. The effect of this degradation can lead to the complete failure of most state of the art dielectrics.

These problems are solved, herein, by a new approach, which employs the adoption and deployment of materials of construction and electrical components that have been initially designed as a segment of an integral electronics component, package, or system to be subjected to harsh or high temperature environments.

It is therefore an object of this invention to provide the art with a novel power electronics capacitor, which can withstand operating temperatures in excess of 300° C., inclusive, while also maintaining a capacitance between a fraction of one to several $\mu Fs$. Moreover, it is expected that the above parameters will be readily maintained at an operating voltage of about 1–3 $kV_{DC}$. It is also an object herein to build this capacitor in current manufacturing facilities from commercially available materials. It is a further object that these new capacitors have sufficient shock resistance and high reliability for an extended service life.

DETAILED DESCRIPTION

Figure 1:
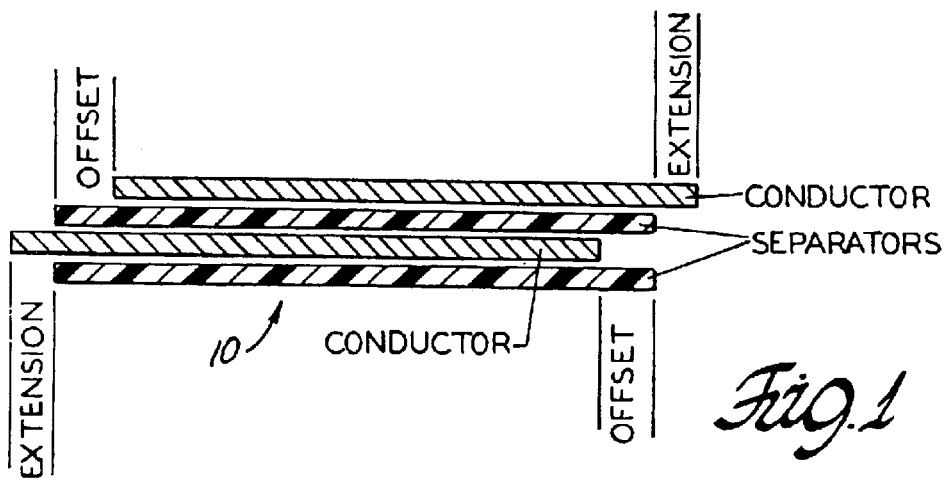
FIG. 1 is an end view of a layout of this invention showing the arrangement and interrelationship of conductors and separators.

Starting with a suitable dielectric material for our newly designed insulator/separator, we sought a material that would withstand temperatures in excess of 300° C. This separator should be of capacitor grade quality that will provide a large capacitance area, also survive high voltage stresses, and retain its insulator properties at higher temperatures. These include a high RC (DC resistance× capacitance or the static time constant) which is manifested by a low DC leakage current, and a low DF (dissipation factor). Our initial analyses and subsequent research tests found that mica papers are useful in various applications, and are well-suited for high temperature and/or harsh environments, where electronic power systems need good electrical properties and extended survivability.

Capacitor grade, reconstituted mica papers are known as self-supporting sheets comprised of thin, overlapping flakes or platelets of inorganic material known as native muscovite $[KAl_2(Si_3AlO_{10})(OH,F)_2]$. Because these sheets are made by a typical paper making process, they can be supplied in either sheet or roll form because they have sufficient strength to be both flexible and self-supporting. These separator sheets range in thickness from about 12.7 $\mu$m (0.0005 in) to about 50.8 $\mu$m (0.002 in). They are also free of foreign matter, especially organic materials, like adhesives, binders, and coloring agents, which could inhibit or interfere with the physical or electrical properties that we seek for a maximum service application of about 350° C., or even higher. Finally, reconstituted mica papers are substantially free of any materials that could adversely impact their performance as separators at our desired operating conditions and temperatures.

In a preliminary test, we found that a mica paper sheet, (6 cm×6.5 cm×25 $\mu$m), could sustain 2 $kV_{DC}$ with an 80 $V_{DC}/\mu$m voltage stress capability when subject to a gauge pressure of about 206.8 kPa in $CO_2$. Thicker or thinner sheets of mica paper could also be employed to either increase or decrease the voltage rating capability for a particular capacitor's application. Likewise, the same goal could be achieved herein by the utilization of any combination of these sheets.

Next, capacitor-grade, metal electrodes for our capacitor are conveniently formed from any metal conductor, such as aluminum, copper, iron, molybdenum, nickel, niobium, silver, tantalum, titanium, tungsten, or their combinations and alloys. Such metals are utilized herein in the form of plates, sheets, and rolls. We have found that conductors, typically ranging from 4 $\mu$m (0.00016 in) to 12.7 $\mu$m (0.0005 in), are both effective and economic when used in roll form to manufacture commercial quantities of capacitors.

Our main objective for a high operating voltage of 1–3 $kV_{DC}$ mandated that a suitable impregnant/operating environment be developed to insulate the highly stressed electrode edges and to fill and insulate all of the critical regions or microscopic voids between the mica platelets. Such voids normally constitute about 30% of the total volume of this separator material. Therefore, our initial choices were between either a pressurized gas or a liquid. Among these choices, we selected any pressurized gas that had a high voltage strength and good thermal stability at operating temperatures in excess of 350° C. We readily rejected liquids because those that are stable at temperatures above 300° C. are highly conductive or have excessive DF. Moreover, the use of liquids might disrupt the van der Waals forces between the mica platelets or flakes, and could potentially degrade or damage our separators.

The above considerations led us to evaluate air, $N_2$, $CO_2$, and their mixtures, at pressures ranging from near ambient to 405.2 kPa. Our goal was to develop suitable processing, operating, and conditioning environments that would achieve prolonged capacitor lives. Other gases of a non-reacting nature, and their combinations, may be employed herein if they have comparable thermal stability and electric strengths to those mentioned above. For example, $SF_6$ was not selected herein because of its reactivity at temperatures above 250° C. that might degrade our mica insulator. The electric strength of a gas is known in the art as a measure of its breakdown potential under an applied voltage. The majority of our work herein was performed within a pressurized environment of $CO_2$ gas. We initially chose said gas because we expected that its values for partial discharge inception and extinction voltages within our combined system of mica paper insulators and gas impregnants would be approximately twice the values for $N_2$. However, our subsequent $N_2$ work surprisingly changed this opinion because we found $N_2$ to have a higher system electric strength in combination with our insulator/dielectric package than $CO_2$.

According to our invention, individual capacitor elements may be prepared by any of the well known methods of the art. Typical processes include either flat and stacked lay-ups, or convolutely wound rolls. FIG. 1 is a general depiction of a lay-up 10 contemplated by this invention which shows the arrangement and relationships of constituents desired herein for our claimed capacitors. Regardless of the process, this operation should normally take place within an environmentally controlled production facility that is free from dust, foreign matter, and contaminants that could interfere with the ultimate performance of our capacitor element. Further, an adequate amount of precautions must be taken during this process to avoid wrinkles, tears, or damage to any of the positioned layers.

To achieve commercial production rates of our capacitor elements, we favor the wound technique, with or without an applied tension. The aforementioned capacitor grade materials are arranged by us to provide a single wound capacitor element (WCE) of this invention. Referring again to FIG. 1, a standard winding machine, with a take-up means of about one inch of diameter, is employed to collect a feed of two conductor layers, separated and insulated from each other—and from said take-up means—by the positioning there between, of at least one layer of an insulator material. Examples of a suitable take-up means include an arbor, collet, mandrel, spool, or the like. The geometric shape of this means is not important and can be circular, flat, oblong, or the like. Also, it is very desirable for said means to be tapered, or to be designed with a removable boss, shoulder, or flat protuberance, to facilitate the proper alignment of layers and the subsequent removal of a completed WCE.

For descriptive purposes, the individual thickness of the above insulator and conductor can range from 10–50 $\mu$m and 5–10 $\mu$m, respectively. Herein, the insulator is also used as a support or foundation for the conductor layers. As a consequence, the inner and outer most turns of our WCE are without foil. They are inactive.

The above feed is conveniently supplied in the form of rolls having a preselected length, width, and thickness sufficient to produce one or more WCEs, each with a chosen number of turns to yield a previously chosen capacitance value. When said number is achieved, the ends of the outer most conductor layers are overlapped about 3 cm or more, and the last few winding turns are then completed without foil. Thusly, the exterior separator layer has been wound over the last outer most conductor layer several more times to protect and insulate the finished WCE. The product WCE is next secured by any convenient means, such as an adhesive or tape, which has suitable dielectric properties. A specific tap example includes conventional products based upon polyethylene terephthalate or fluorocarbon resins. These tapes or adhesives can be conveniently placed over the end of the last exterior layer of the WCE to prevent inadvertent uncoiling during subsequent handling and processing. Most probably, this tape or adhesive will be removed after compression and before final assembly or use because the tape or adhesive may not be thermally stable at our expected test and/or operating temperatures.

Figure 2:
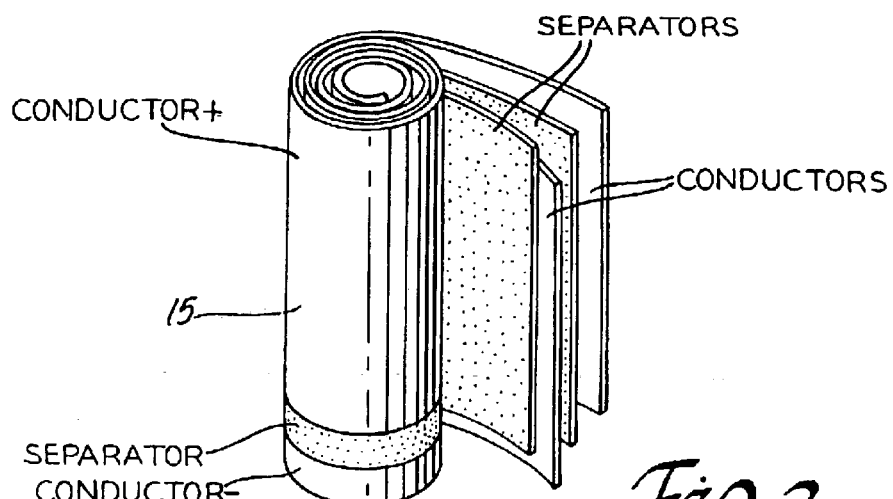
FIG. 2 is a view in perspective of first embodiment of a wound capacitor element of the present invention in roll form.
Figure 3:
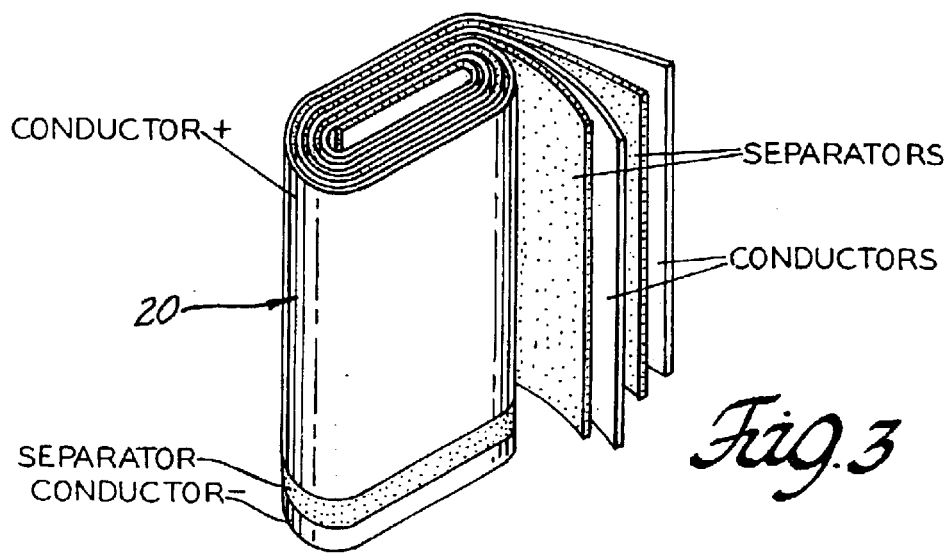
FIG. 3 is a view in perspective of a second embodiment of a wound capacitor element in packet form.

When appropriate, an impervious, protective sleeve can also be applied over this final exterior layer to enhance the structural integrity of the WCE. This is easily accomplished by adding several additional turns to the WCE of about 25 $\mu$m (0.001 in) thickness metal foil. Stainless steel and other metals, like those enumerated for conductors, are suitable for this purpose. An appropriate degree of care to center this sleeve over the winding must be taken to avoid shorts by contact with the conductors. Again, a tape or adhesive can be utilized, as above, to secure the end of this sleeve. As thus completed, the WCE will typically be in the form of a roll 10 or packet 20 as depicted in FIGS. 2 and 3, respectively. While other potential geometric shapes are possible, these particular forms are most compact and useful for the limited space of power electronic capacitors. We prefer the roll form most frequently for our applications.

In a preferred embodiment of this invention, a mica paper separator is initially positioned over the take-up means that comprises two layers of about 23 $\mu$m (0.0009 in) mica paper and single layer of about 18 $\mu$m (0.0007 in) mica paper. Within the capacitor art, it is a very common practice to employ multiple sheets, layers, or thickness of dielectric within any given insulating layer to achieve adequate spacing and separation between metal conductors. The purpose for this practice is to minimize the effects of any potential voids, faults, or other defects which might exist within any one sheet. This arrangement yields a low probability for any superimposed alignments of defects within the separator layer that could create direct paths for electric failure through the multiple sheets or layers. Thereby, the performance and life of our WCEs are greatly enhanced.

Then, a conductor layer of aluminum foil of about 6 $\mu$m (0.0002 in) is applied over said separator layer and said take-up means. Next, a second separator layer is positioned over this first conductor layer, which is similarly comprised of two 23 and one 18 $\mu$m thickness of mica paper. Finally, we place a second conductor layer of 6 $\mu$m foil directly over the second insulator layer. For this preferred embodiment, a feed for the separator and conductor layers is conveniently furnished in the form of rolls with sufficient separator or conductor material, respectively, to make a multiplicity of windings of several centimeters in width. For the following examples, we employed rolls of about 7.62 cm in width and in excess of about 530 cm which was our predetermined length to achieve the desired capacitance value for each winding. Thusly, one or more windings were obtained from each roll. Different, or similar, roll dimensions can be used for separators and conductors depending on the ultimate application of our power electronics capacitor, and the requisite number of turns and width necessary to achieve any predetermined capacitance area. Capacitor grade materials as used herein are commercially available from various industrial sources known to the art. Custom Electronics, Incorporated, of Oneonta, N.Y., USA, assisted us in obtaining these materials and by preparing our WCEs according to our design and specifications. Northrop Grumman Science & Technology Center, Pittsburgh, Pa., USA, also assisted us in processing and testing the product WCEs.

Figure 4:
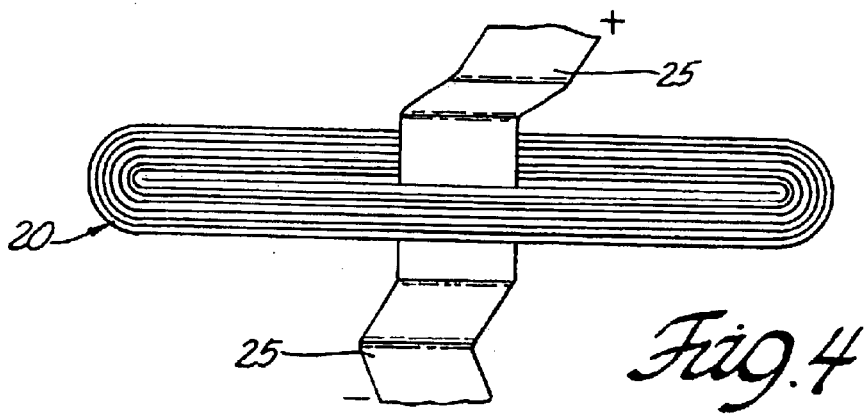
FIG. 4 is an end view of a flattened embodiment of FIG. 3 with simple electrical interconnections extending from opposite poles.
Figure 5:
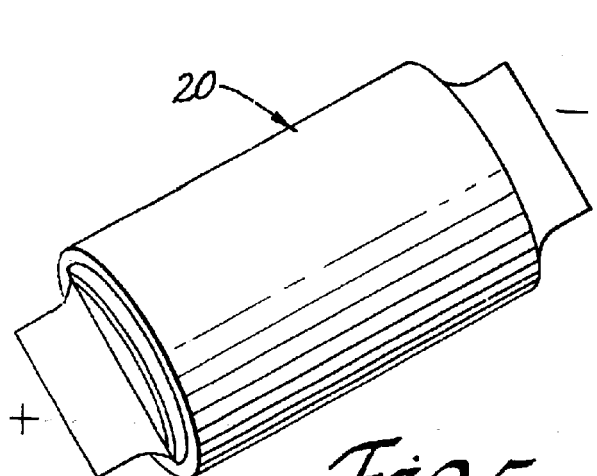
FIG. 5 is a perspective view showing a completed packet of FIG. 3 with crimped conductor peripheries and electrical connections in the form of conductive tabs.

For this preferred WCE, the separator layers are essentially overlain, in registration, on top of each other with the first conductor layer separating them. When the second conductor is then positioned over the second separator layer, we longitudinally overlap the first conductor by about 6.9 cm at the center. This staggered placement causes the edges or outer peripheries of our conductors to alternatingly extend about 0.38; cm beyond the edges of the corresponding separator layers on which they are positioned. The opposing edges or peripheries of these conductors lie buried between the separator layers. Thus, the first conductor layer will extend above and slightly beyond the left edge of the first separator layer, and the second conductor will extend above and beyond the right edge of the second separator layer. This procedure is thus repeated in multiple windings until all separators and conductors fed are consumed, and a final WCE is obtained. After removal from the take-up means, each WCE is gently flattened to close the open space left in the center by removal of said take-up means. The resultant WCE is generally depicted in FIG. 4 for either a roll or packet form. By repeating this procedure, we prepared 20 WCEs of the preferred embodiment for the following experiments of Tables 1–3. As a variant of this procedure, the buried conductor edges may be slightly folded over (less than one centimeter) to double their thickness along this edge. This effort will produce a rounded and smooth edge wherein the voltage stress is lower than a conventional cut and sharp edge. It should also be understood from the above description that the separators need not be in registration and can overlap somewhat provided that the conductors still extend beyond the respective separator edges.

The extended foil edges of each WCE are then left as they are wound, or they are subsequently folded, crimped, or crushed together along each unwound side to form poles of different polarity. Then, simple electrical connection means are made to either the extended or crushed foils of the WCE by welding, adhesive bonding, or thermal spraying of conductive metal sprays, such as copper, nickel, silver, and the like. For example, and referring to FIG. 4, our first three WCEs were provided with electrical connection means 25 consisting of two approximately 6.4 mm by 0.075 mm nickel strips as electrical leads that were directly attached to said foils by an Aremco-Bond™ 597A (silver filled) paste. This paste is commercially available from Aremco Products, Inc., Valley Cottage, N.Y. USA. For our subsequent work, we found that these nickel strips 25 could be more conveniently attached by direct insertion between two layers of copper spray. It is to be understood that a variety of termination means, such as depicted in FIGS. 4, 5, 7, and 8, could be employed to make an electrical connection, including disks, pads, tabs, terminals, threaded inserts, studs, terminals, wires, and the like.

Figure 6:
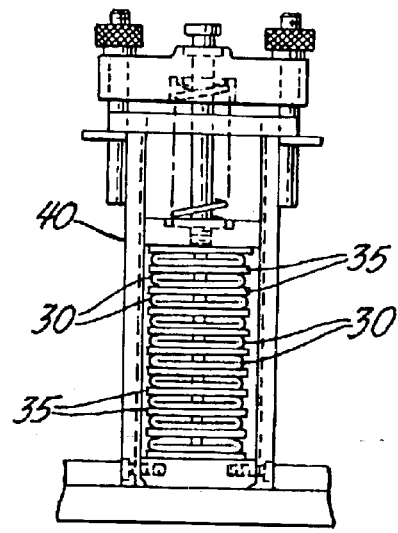
FIG. 6 is a front view of a machine suitable for further compressing one or more capacitor elements of this invention.

Next, individual WCEs 30, or multiple stacks thereof, were interspersed with either metal or plastic plates 35, and positioned within a pressing fixture 40, such as depicted in FIG. 6. Alternatively, this fixture could be a mechanical, hydraulic, or electrically actuated press. It should be understood that the above plates are clean and free of contaminants, burrs, or defects that might other wise cause damage to the WCEs during compression. Then the WCEs were compressed at about 2.0 MPa gauge pressure to form final WCEs of approximate dimensions of 7.8 cm×6.6 cm×0.57 cm. We have found that the performance and stability test data for WCEs of this size are acceptable prototypes for the prediction of similar characteristics for either larger or smaller scale capacitors manufactured in this manner. When we initially inspected these WCEs, they each had a compressed separator thickness near 45 µm; a dielectric constant (ε) of about 3.4, and measured capacitance of about 0.3 µF.

Figure 7:
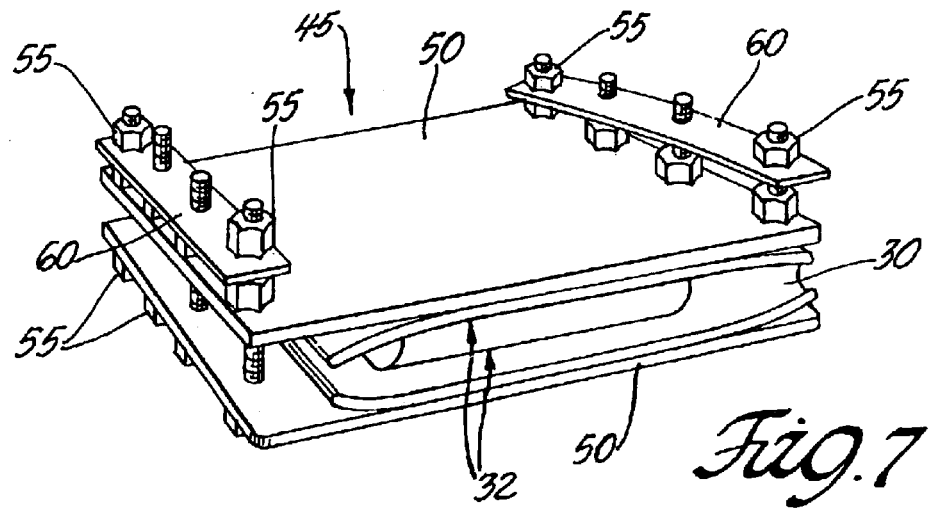
FIG. 7 is a pictorial view of a test fixture holding a wound capacitor element therein that has been both flattened and compressed according to this invention.

Referring to FIG. 7, each WCE was then secured within a test fixture 45 as follows. First, the exposed faces 32 (top and bottom) of a WCE were covered with ten layers of 23 µm mica paper, one layer of 640 µm alumina, and a stainless steel plate 50 of about 11 cm×11 cm×3.2 mm. The purpose of the additional sheets of mica paper and alumina were to provide major high-voltage insulation and isolation for each test fixture mounted WCE. Preferably, these sheets and metal plates also have dimensions of width and length that extend beyond the corresponding dimensions of the mounted WCE. This assembly was also compressed to 2.0 MPa gauge pressure as above, and then secured by any conventional fastening means to maintain that compression. For instance, mounting strips 60 were placed over the stainless steel plates 50 of each test fixture 45 to frame each WCE. These strips were then held in place by four or more conventional fasteners 55 that are inserted through preformed apertures within said plates 50 and strips 60. These mounting strips are then held together by the placement and tightening of these fasteners. A convenient fastener system herein comprises at least four traditional nuts torqued onto four traditional bolts.

EXAMPLES

Figure 9:
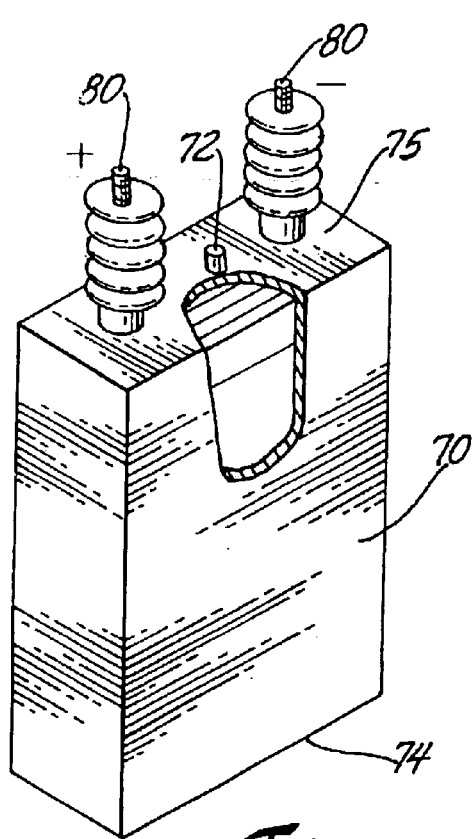
FIG. 9 is a generally perspective view of a capacitor of this invention comprising a single, flattened and compressed, wound capacitor element of FIG. 3 inserted within a small housing.
Figure 10:
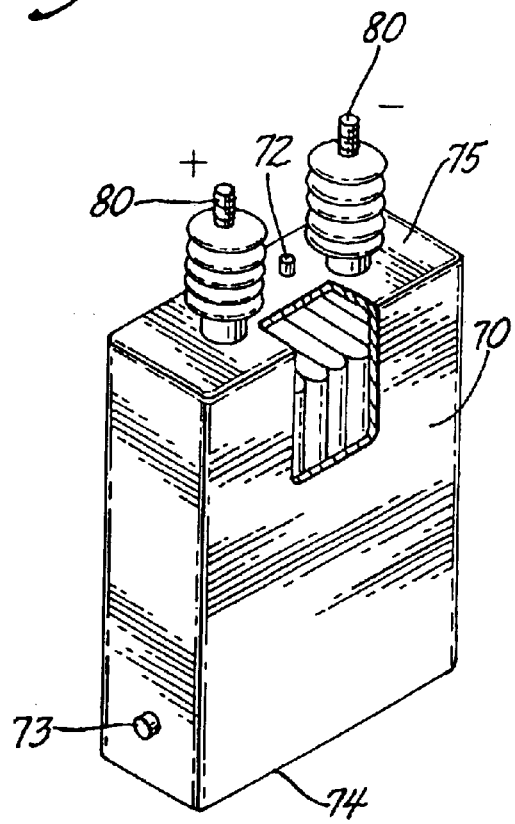
FIG. 10 is a perspective view of a stacked capacitor of this invention comprising the capacitor stack of FIG. 8 inserted within a larger housing.

All of our experimentation was performed in a controlled environment of a specially modified autoclave having two high voltage feed-throughs to provide for high voltage input and current monitoring. It should be understood, however, that one or more of our WCEs could be commercially packaged within a suitable housing or container 70, (see FIGS. 9 and 10), then evacuated, and thereafter filled with a gaseous environment of any of the aforementioned high voltage strength gases. While the housings 70 are shown in rectangular form, it should be readily understood that other geometric configurations are possible, such as a tubular, prismatic, and other geometric shapes. For instance, the sharp edges and corners of the depicted housings could be somewhat rounded to relieve potential pressure stresses at the corners and edges. As shown in FIGS. 9 and 10, ports 72, 73 can also be conveniently attached to or formed in these containers to facilitate the operations of gas evacuation and subsequent filling during the manufacture of our capacitors. Further, the housings should hold our WCEs in a spaced relationship to their side- and end-walls to avoid any shorts or electrical contacts. They should also conserve space, remain air-tight, and withstand moderate fluctuations of pressure. Moreover, a flexible side-wall, bellows, pressure vent, or other means for pressure relief are possible ways for this housing to adjust to cyclic thermal episodes in harsh environments. Finally, these housings can be of virtually any material of construction, including plastics, metals, and/or their combinations, to supply adequate pressure containment and thermal resistance. We prefer a flexible metal container, having a closed bottom 74, and an attachable lid 75 with ceramic bushings 80 as depicted in FIGS. 9 and 10. Said lid being attachable by any convenient means, such as adhesive bonding, welding, screwing, and the like.

Tests in $CO_2$

On the first prepared WCE test assembly, we ran some preliminary tests in the above autoclave which was used to contain this assembly, to maintain an operating environment, and to supply electricity. We first heated said assembly in air to about 100° C.; then evacuated for 30 minutes; and later pressurized to a gauge pressure of about 206.8 kPa of $CO_2$. We subsequently applied voltage at that temperature in 1.0 $kV_{DC}$ increments, increasing from 0 to 3.0 $kV_{DC}$ without failure. Thusly, we concluded that our WCEs could sustain a voltage stress of about 67 $V_{DC}$/µm at a temperature of 100° C. with an applied voltage of about 3.0 $kV_{DC}$. Thereafter, we entirely removed the voltage, and then increased the $CO_2$ pressurized environment temperature to 220° C. We next resumed voltage application to this assembly to again achieve 3.0 $kV_{DC}$, but this time the WCE failed under said operating conditions at about 2.7 $kV_{DC}$. In later evaluations, we observed that the dielectric strength of a specific WCE test assembly was typically lower at its initial temperatures before being heated to about 350° C. Based upon this observation, we thereafter determined that high voltages should not be applied to a WCE until it had first been thermally processed at 350° C. Also, we adopted a preference from this conclusion that each WCE test assembly should first be heated, degassed, and dehydrated at a temperature in excess of the expected operating temperature at which any voltage stresses would be applied.

To further test the performance capabilities of these WCE test assemblies, we conducted sequential experiments (one at a time) on the next 11 assemblies using the above mentioned autoclave. Therein, we employed the above high temperature procedures for the dehydrating, processing, conditioning, and testing of these WCE assemblies. Thereby, the mica paper separator was also dehydrated and degassed to remove any potential deleterious materials, which could cause low DC resistance and/or high DF in the WCE assemblies. Initially, we heated each WCE in air for more than 12 hours at about 100–110° C. This was then followed by autoclave evacuation for about 30 minutes to first remove air, and then to replace it with either $CO_2$ or a 99% $N_2$/1% $H_2$ mixture. Each test assembly was thereafter heated within the aforementioned gas at a gauge pressure ranging from 103.4 to 206.8 kPa for three temperature stages (250° C., 320° C., and 350° C.) of about 2–3 hours per stage. Between each stage, the autoclave was evacuated for about 15 minutes; then repressurized with gas; and thereafter heated to attain the next temperature stage.

Each thermally processed assembly, as above, was next conditioned. Those familiar with the art may also consider this as a "burn-in" procedure. It additionally served as the initiation of our life test for each WCE assembly since we therein started the application of a DC voltage to the assembly within the autoclave at around 320° C., with either $CO_2$ or a $N_2$ gas mixture, maintained at a predetermined pressure. First, we decreased the temperature from about 350° C., as was used in the processing stage, to about 320° C. Then, we increased the gauge pressure to about 344.7 kPa, and thereafter applied a high voltage input to the autoclave approaching 2–3 $kV_{DC}$.

After about 12 hours under these conditions, we observed a decrease in the leakage current to less than 50 $\mu A_{rms}$ (RC>12s) at about 2.0 $kV_{DC}$. By continuous monitoring of said current, we found that RC will generally increase over time. We also observed that insulator failure was precipitous, which was preceded by an abrupt increase in leakage current. These failures normally took the form of a direct puncture within the layers of insulator. Most punctures were located about 1.3 cm from the aluminum foil edges. Some were found at the foil bends where the winding had been flattened and the dielectric stretched. Fewer punctures were found exactly at the foil edges. We also took readings of the WCE test assemblies for capacitance and dissipation factor at about 1 kHz for each of the reported temperature levels.

While most of our voltage stress tests on WCEs were conducted within a $CO_2$ pressurized environment, we found—as our work progressed—that our mica paper insulators were much more stable and had longer lives if a non-reacting gas, like substantially pure $N_2$, were utilized. Yet, the data from our life-cycle tests in $CO_2$ are valuable because they signify operating trends in voltage stresses, gas pressures, and failure rates that can be expected with other gases. The results of these tests are reported in Table 1 below. The effects of voltage stress on WCE lives are very apparent from Table 1 wherein it is reported that they can sustain around 2.0 $kV_{DC}$ for hundreds of hours at about 325° C. Four of seven of our assemblies failed in less than 10 minutes at 2.5–3.0 $kV_{DC}$; one lasted 3 hours; another lasted 1.25 hours; and two (Test Assemblies 4 and 6) were stable for more than 100 hours when just 2.5 $kV_{DC}$ was applied. Moreover, Assemblies 8, 10, and 11 sustained 2.0 $kV_{DC}$ ranging from 40 to 100 hours. Based upon this data, we predict that our individual WCE test assemblies will operate for many hours near 350° C. and 1–3 $kV_{DC}$ within a pressurized environment of $CO_2$, $N_2$, or like non-reacting gases and their mixtures. However, this data also suggests that the use of even a small amount of a reactive (reducing) gas mixture (99% $N_2$//1%$H_2$), as in our Assembly 6 Cont' test of Table 1, can render the insulator unstable at our desired operating temperatures and voltage stresses. It further appears from Table 1 data; that if a conditioning operation first takes place at a gage pressure of about 344.7 kPa, then our WCEs may be able to operate at pressures close to atmospheric while also achieving better stability and longer lives.

We additionally measured several dielectric properties of the WCE assemblies of Table 1 over the range of 25–350° C. while they were in the autoclave with $CO_2$ gas. We found that the temperature coefficient of the capacitance of our windings (0.3 $\mu$F) under these circumstances approximated about 44 ppm/° C. Table 2 below records the DF measured at 1 kHz that was obtained before our initiation of a life test. As indicated in the reported values of Table 2, the DF will increase as the temperature is increased. We also observed that the capacitance did not change under the reported applied voltages and thermal stresses of Table 1 as life testing ensued.

When we proceeded to life testing in $CO_2$ at 319–325° C. and an applied voltage of about 2.0 $kV_{dc}$, we found that the DF increased for Assembly Number 11 and 11 Cont of Table 1, from an initial value of 0.022 (91 hours at a gauge pressure of 344.7 kPa) to 0.038 (during an additional 138 hours in a gauge pressure of 13.37 kPa). This latter DF measurement was taken approximately two hours before the precipitous failure of this particular assembly. We believe the effects of this DF increase probably contributed to the total failure process. Moreover, it also prompted our need for further tests within a non-reacting gas environment.

Tests in $N_2$

Figure 8:
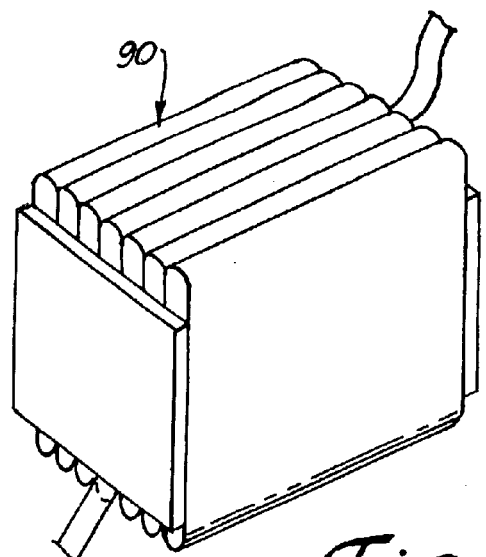
FIG. 8 is a pictorial view of a capacitor stack made in accord with this invention using a plurality of wound capacitor elements that have been flattened, compressed, and coupled in parallel.

Next, we conducted more tests within a $N_2$ environment using the same procedures, as above, for processing, conditioning, and life testing. The tested units included a single WCE assembly, prepared as above, and a 2.4 $\mu$F stacked unit 90 comprised of 7 additional WCEs adjacently positioned next to one another, as generally depicted in FIG. 8, and electrically connected in parallel. The single assembly, and the stacked capacitor, were tested for their potential as high power electronic capacitors. The life tests were conducted at an applied voltage of 2.0 $kV_{DC}$ with the results listed in Table 3 below. During these tests, we found that the DFs in $N_2$ remained the same for the single assembly, and even observed an actual decrease for the stacked unit from 0.02 to 0.0175.

During this life test, we also imposed a ripple current of 3 $A_{rms}$ at 30 kHz to the applied voltage. Measurements with and without this ripple current confirmed that it had no effect on either the DF or the RC. From our $N_2$ testing, we conclude that our WCEs (capacitor windings) are more stable and reliable in $N_2$ than they were when subjected to the same operating conditions in $CO_2$.

The shorter life time of the stacked unit, as compared to that of a single assembly, may be attributable to the larger area effect of the bigger unit. With reference to Tables 1 and 3, it is also noted that the ~100 hour life of our stacked capacitor in $N_2$ is nearly identical to that of a single WCE within a $CO_2$ environment under the same conditions.

With respect to RC, Table 1 shows the lowest measured RC of 3 seconds for Assembly Numbers 3 and 5 in pressurized $CO_2$. In contrast, Table 3 discloses a lowest measured RC of 13 seconds for our Assembly Number 12 Cont in $N_2$. Based upon these findings, it is evident that the direct current resistivity of our mica paper insulator at our elevated operating temperatures will not contribute significantly to DF.

As disclosed herein, we have provided a WCE made of one or more separator layers of mica paper, one or more layers of metal foil, and a pressurized environment of non-reacting gases operating within a range from near ambient to about 405.2 kPa. We have also demonstrated the feasibility of combining one or more of these WCEs to form a capacitor stack. While we used an autoclave herein to house these capacitors, they could readily be packaged for commercial manufacture in either plastic or metal containers of geometric forms noted above. Also, low inductance ceramic bushings can be used on these containers for making external electrical contacts. Such a capacitor can be economically manufactured and deployed in large amounts with currently available production methods and materials.

We wish it understood that we do not desire to be limited to the exact details of construction or methods shown herein since obvious modifications will occur to those skilled in the relevant arts without making any departure from the spirit and scope of this disclosure and the following claims.

TABLE 1

| Assembly Number | Temperature (° C.) | Applied Voltage ($V_{DC}$) | Pressure♦ $CO_2$ (kPa) | RC (sec) | Life (hrs) |
| --- | --- | --- | --- | --- | --- |
| 2 | 320–326 | 3,000 | 344.7 | 4 | 3.0 |
| 3 | ~325 | 3,000 | 344.7 | 3 | 0.13 |
| 4 | 320–329 | 2,500 | 37.9* | 25 | >113.0 |
| 4 Cont | 329 | 2,750 | 37.9 | NR | 0.008 |
| 5 | 330 | 2,500 | 34.5 | 3 | 1.25 |
| 6 | 330 | 2,500 | 344.7 | 47 | >43 |
| 6 Cont | 324 | 2,500 | 27.6 | 64 | >66 |
| 6 Cont' | 328 | 2,500 | 34.5** | 34 | 0.08 |
| 7 | 327–330 | 2,500 | 27.6 | 7 | 0.05 |
| 8 | 315–327 | 2,000 | 344.7 | 26 | 170 |
| 9 | 330 | 2,500 | 344.7 | NR | 0.008 |
| 10 | 320–330 | 2,000 | 344.7 | 83 | 40 |
| 11 | 320–325 | 2,000 | 344.7 | 24 | >91 |
| 11 Cont | 319–325 | 2,000 | 13.8 | 20 | 140 |

Explanations
*Started at a gauge pressure of 344.7 kPa and decreased to 37.9 kPa
Cont—Continued testing of same assembly
Cont'—Further testing of same assembly
**Mixture of 99% $N_2$/1% $H_2$ substituted for $CO_2$ gas
NR—Value Not Recorded
♦All Reported Pressures are Gauge Pressure

TABLE 2

| Temperature (° C.) | DF @ 1 kHz |
|---|---|
| 25 | ~0.0007 |
| 100 | <0.0020 |
| 250 | ~0.0010 |
| 300 | ~0.0015 |
| 325 | ~0.0200 |
| 350 | ~0.0300 |

TABLE 3

| Assembly Number | Temperature (° C.) | Applied Voltage ($V_{DC}$) | Pressure♦ $N_2$ (kPa) | RC (sec) | Life (hrs) |
|---|---|---|---|---|---|
| 12 | 325–330 | 2,000 | 344.7 | 22 | >112 |
| 12 Cont | 341–345 | 2,000 | 344.7 | 13 | >300 |
| 12 Cont' | 348 | <2,000 | 48.3 | NR | Failed |
| 13 (7-Stack) | 325–335 | 2,000 | 344.7 | 145 | ~100 |

Explanations
Cont—Continued testing of same assembly
Cont'—Further testing of same assembly
NR—Value Not Recorded
♦All Reported Pressures are Gauge Pressure

What is claimed is:

1. A method of making a power electronics capacitor comprising the steps of:
   (a.) providing at least two conductor layers;
   (b.) inserting at least one separator layer between said conductors to provide a structure of conductor-separator-conductor;
   (c.) covering the upper and lower exposed conductors with at least one separator layer to thereby derive a structure of separator-conductor-separator-conductor-separator;
   (d.) repeating steps (a) through (c) whereby a capacitor element is formed that can withstand temperatures of 300° C. and above, and sustain an operating voltage of about 1–3 $kV_{DC}$;
   (e.) applying pressure to laminate the capacitor element of (d);
   (f.) forming electrically connective means on opposing sides of said laminated structure to attach leads to an external world;
   (g.) providing a housing means for containing the laminated structure comprised of an open, elongated body with a lid;
   (h.) connecting said electrical connective means and leads of (f) to terminals within said lid which are isolated therefrom by insulative bushings to receive power from an external source to energize said capacitor;
   (i.) inserting the laminated structure of (f) into the housing and holding said structure in a substantially spaced relationship with respect to said housing and said lid;
   (j.) closing said housing by permanently affixing the lid to said housing to hermetically seal said housing and laminated structure;
   (k.) evacuating gaseous contents by application of a vacuum to the closed housing of (j);
   (l.) filling the evacuated, closed housing with a non-reacting gas at pressures ranging from about ambient to 405.2 kPa; and
   (m.) utilizing the capacitor of (l) in a power electronics system by supplying energy from the external power source.

2. The method of claim 1 wherein the layers of conductors and separators are in complete registration.

3. The method of claim 1 wherein the layers of separators are in A registration and the layers of conductors alternatingly emerge from peripheries of said separators to form extended conductors.

4. The method of claim 1 wherein the conductor element of (d) is prepared by a winding process to form a wound capacitor element.

5. The method of claim 1 wherein said conductors are selected from the group of metals consisting of aluminum, copper, iron, molybdenum, nickel, niobium, silver, tantalum, titanium, tungsten, and their alloys.

6. The method of claim 1 wherein said conductors range in thickness from about 4 to 25 μm.

7. The method of claim 1 wherein said separator ranges in thickness from about 12.7 to 50.8 μm.

8. The method of claim 1 wherein said separator is formed of at least one sheet of mica paper.

9. The method of claim 1 wherein said separator is formed of more than one sheet of mica paper.

10. The method of claim 1 wherein said non-reacting gas is selected from the group consisting of air, nitrogen, carbon dioxide, and their mixtures.

11. The method of claim 1 wherein said affixing of the lid is selected from the group consisting of adhesive bonding, welding, and metal sprays.

12. The method of claim 1 wherein the stacked capacitor is formed by inserting more than one laminated structure of step (f) into said housing.

13. The method of claim 1 wherein said electrical connection means are selected from the group consisting of threaded inserts, terminals, pads, disks, studs, tabs, and wires.

* * * * *